(12) United States Patent
Mire et al.

(10) Patent No.: US 12,164,487 B2
(45) Date of Patent: Dec. 10, 2024

(54) CONSOLIDATING MULTIPLE DATABASES INTO A SINGLE OR A SMALLER NUMBER OF DATABASES

(71) Applicant: Capital One Services, LLC, McLean, VA (US)

(72) Inventors: Dennis J. Mire, Dallas, TX (US); Kishore Doppalapudi, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/237,596

(22) Filed: Aug. 24, 2023

(65) Prior Publication Data

US 2024/0061818 A1     Feb. 22, 2024

Related U.S. Application Data

(63) Continuation of application No. 17/694,965, filed on Mar. 15, 2022, now Pat. No. 11,775,489, which is a continuation of application No. 16/855,176, filed on Apr. 22, 2020, now Pat. No. 11,281,638.

(51) Int. Cl.
| | |
|---|---|
| *G06F 16/21* | (2019.01) |
| *G06F 9/445* | (2018.01) |
| *G06F 16/17* | (2019.01) |
| *G06F 16/182* | (2019.01) |
| *G06F 16/22* | (2019.01) |

(52) U.S. Cl.
CPC ........ *G06F 16/214* (2019.01); *G06F 9/44505* (2013.01); *G06F 16/1734* (2019.01); *G06F 16/182* (2019.01); *G06F 16/211* (2019.01); *G06F 16/221* (2019.01); *G06F 16/2282* (2019.01)

(58) Field of Classification Search
None
See application file for complete search history.

(56) References Cited

U.S. PATENT DOCUMENTS

| | | |
|---|---|---|
| 5,802,514 A | 9/1998 | Huber |
| 6,999,956 B2 | 2/2006 | Mullins |
| 7,043,716 B2 | 5/2006 | Zimmer et al. |
| 7,318,066 B2 | 1/2008 | Kaufman et al. |
| 7,403,934 B2 | 7/2008 | Polizzi |

(Continued)

FOREIGN PATENT DOCUMENTS

| | | |
|---|---|---|
| CN | 107357942 A | 11/2017 |
| JP | 2007241346 A | 9/2007 |

*Primary Examiner* — Kim T Nguyen
(74) *Attorney, Agent, or Firm* — Banner & Witcoff, Ltd.

(57) ABSTRACT

A system, method, and computer-readable medium for consolidating multiple databases into a single or a smaller number of databases is described. An improved structure of target database may be achieved by removing constraints used when creating legacy databases. According to some aspects, these and other benefits may be achieved by combining multiple source tables into a single target table with errors being identified and addressed during the creation of the instructions to generate the target table. In implementation, this may be effected by converting values from a source table and values from a target table into normalized versions of those values and then comparing the normalized values. A benefit includes verifying that the data from the source table is being properly reflected in the target table.

20 Claims, 7 Drawing Sheets

(56) References Cited

U.S. PATENT DOCUMENTS

| | | | |
|---|---|---|---|
| 10,532,324 | B1 | 1/2020 | Masquelier et al. |
| 10,533,152 | B1 | 1/2020 | Belgrader et al. |
| 11,281,638 | B2 * | 3/2022 | Mire ................... G06F 16/214 |
| 11,714,812 | B2 * | 8/2023 | Kancharla ........... G06F 16/2379 |
| | | | 707/714 |
| 11,775,489 | B2 * | 10/2023 | Mire ................... G06F 16/211 |
| | | | 707/609 |
| 11,847,130 | B2 * | 12/2023 | Kaspa .................. G06F 16/254 |
| 2004/0107183 | A1 | 6/2004 | Mangan |
| 2004/0117731 | A1 | 6/2004 | Blyashov |
| 2005/0198618 | A1 | 9/2005 | Lalonde et al. |
| 2006/0010195 | A1 | 1/2006 | Mamou et al. |
| 2006/0069717 | A1 | 3/2006 | Mamou et al. |
| 2009/0012842 | A1 | 1/2009 | Srinivasan et al. |
| 2009/0282067 | A1 | 11/2009 | Bendigeri et al. |
| 2011/0088011 | A1 | 4/2011 | Quali |
| 2014/0171504 | A1 | 6/2014 | Ganapathy |
| 2018/0024814 | A1 | 1/2018 | Ouali |
| 2018/0095952 | A1 | 4/2018 | Rehal |
| 2018/0096001 | A1 | 4/2018 | Soza |
| 2019/0354708 | A1 * | 11/2019 | Fisher .................. G06F 16/212 |
| 2021/0103630 | A1 | 4/2021 | Ware et al. |
| 2021/0130368 | A1 | 5/2021 | Nowak et al. |
| 2021/0202091 | A1 | 7/2021 | Receveur et al. |
| 2021/0334251 | A1 * | 10/2021 | Mire ................... G06F 16/214 |
| 2021/0338838 | A1 | 11/2021 | Hageman et al. |
| 2022/0207004 | A1 * | 6/2022 | Mire ................... G06F 16/182 |
| 2024/0061818 | A1 * | 2/2024 | Mire ................... G06F 16/221 |

\* cited by examiner

CONSOLIDATING MULTIPLE DATABASES INTO A SINGLE OR A SMALLER NUMBER OF DATABASES

CROSS-REFERENCE TO RELATED APPLICATION

This application is a continuation of U.S. Non-Provisional patent application Ser. No. 17/694,965, filed Mar. 15, 2022, which is a continuation of U.S. Non-Provisional patent application Ser. No. 16/855,176, filed Apr. 22, 2020, now U.S. Pat. No. 11,281,638, the disclosures of which are incorporated by reference herein in their entirety and made part hereof.

FIELD OF USE

Aspects of the disclosure relate generally to databases. More specifically, aspects of the disclosure may provide for enhanced creation and maintenance of one or more databases.

BACKGROUND

As companies grow and change, backend systems need to change as well. With advances in cloud-based storage techniques, companies are increasingly transitioning from legacy relational databases, often partitioned per geographic area, to cloud-based databases. Some approaches to transition legacy databases to cloud-based databases have included copying the structure and content of each legacy database to a new cloud-based database. This one-for-one approach does not always take advantage of the cloud-based storage platforms as conventional partitions may still exist in the copies of the databases where those partitions are meaningless in the cloud-based environment. Additionally, based on the volume of data to be moved to the cloud-based environment, the underlying process may be protracted in length as massive databases are joined with similarly massive databases, the resulting joining operations growing exponentially with the number of columns and rows to be moved.

Aspects described herein may address these and other problems, and generally improve the quality, efficiency, and speed of transitioning database systems by offering improved processes for conducting these transitions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for consolidating multiple databases into a single or a smaller number of databases. This may have the effect of improving the structure of the resulting database or databases by removing unneeded constraints present in the legacy databases. According to some aspects, these and other benefits may be achieved by combining multiple source tables into a single target table with errors being identified and addressed during the creation of the instructions to generate the target table. In implementation, this may be effected by converting values from a source table and values from a target table into normalized versions of those values and then comparing the normalized values. A benefit includes verifying that the data from the source table is being properly reflected in the target table.

Further aspects described herein may provide for easier generation of the conversion configuration instructions by finding patterns in the source table or tables and replacing sequential target column operations with recursive operations.

More particularly, some aspects described herein may provide a computer-implemented method for creating or modifying a target database with content from one or more source databases. The method may comprise: identifying a first set of relationships between a first source table of a first source database and a target table of a target database, wherein the first set of relationships include specific columns of the first source table and an identification of a table type of the first source table; storing the first set as first source table-specific relationships; identifying a second set of relationships between a second source table of a second source database and the table of the target database, wherein the second set of relationships include specific columns of the second source table and an identification of a table type of the second source table; storing the second set as second source table-specific relationships; assigning an order in the target table in which columns from the first table are to be added; arranging, in the assigned order, columns of the target table to be populated with content from the second table; generating, based on the assigned order and the first source table-specific relationships, a conversion configuration file; recursively generating, based on the assigned order and the second source table-specific relationships, additional conversion information for the conversion configuration file; grouping data from the first database into a first batch; grouping data from the second database into a second batch; executing the conversion configuration file on the first batch; formatting cells in the first batch into a text format; formatting cells in a portion of data from the target database into the text format, wherein the portion of data from the target database corresponds to the first batch; comparing content of text-formatted cells from the first batch and content of text-formatted cells from the portion of data from the target database; generating an alert, based on the comparison, that the content of at least one text-formatted cell from the first batch and the content of at least one text-formatted corresponding cell from the portion of data from the target database do not match; modifying, based on the alert, the conversion configuration file; and executing the modified conversion configuration file, based on the batch from the first database and the batch from the second database, to populate the table of the target database.

According to some embodiments, the first source table may include fact data and the second source table may include history data. A second conversion configuration file may be executed to generate content in the target table based on content from a third table, where the third table is an overwrite table.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving creation and/or modification of a target database based on content from one or more source databases. As discussed further herein, this combination of features may allow for reduced partitions and/or more efficient conversion configuration files.

Before discussing these concepts in greater detail, however, several examples of a computing device that may be used in implementing and/or otherwise providing various aspects of the disclosure will first be discussed with respect to FIG. 1.

Figure 1:
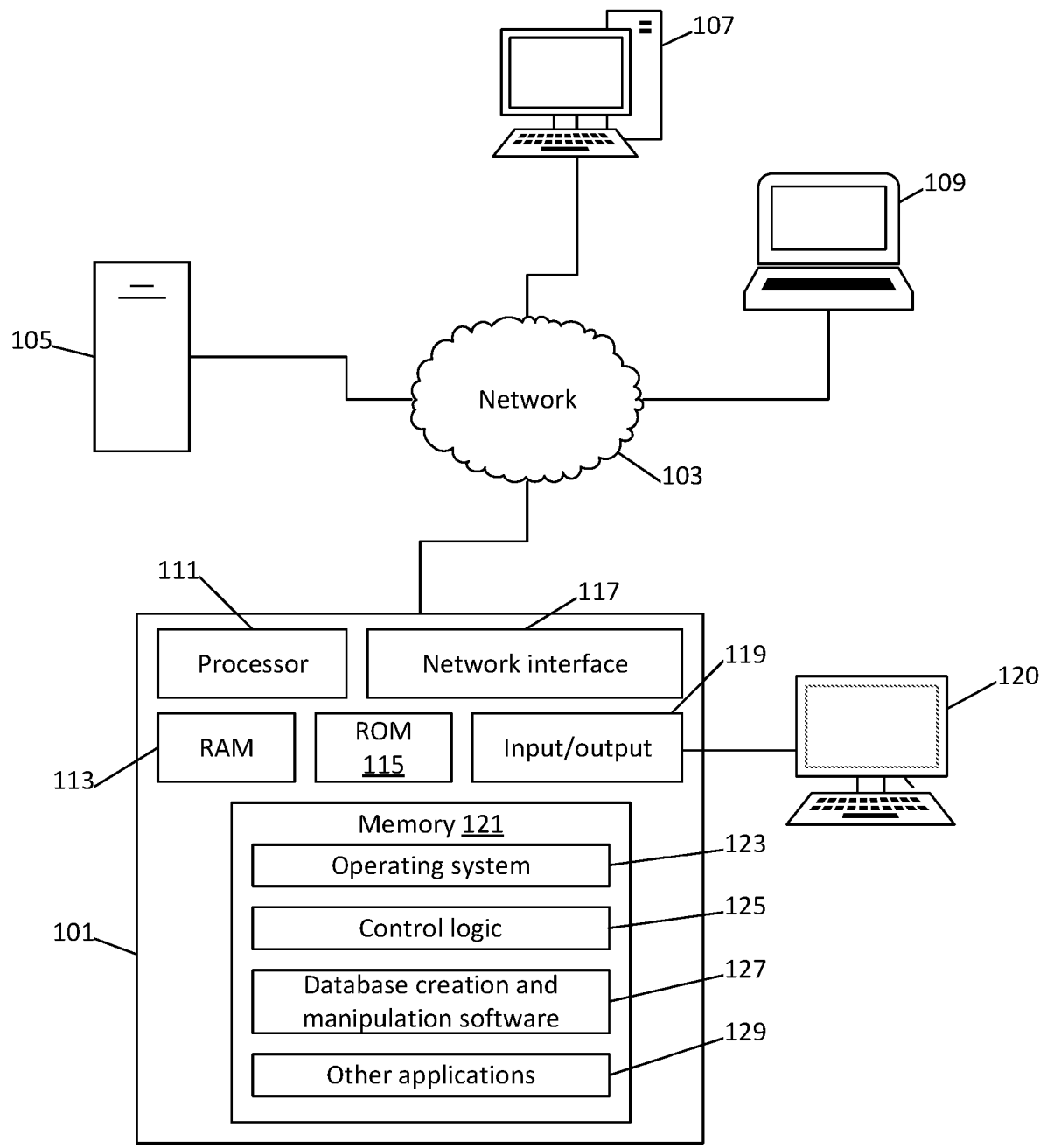
FIG. 1 depicts an example of a computing device and system architecture that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media. Additionally or alternatively, computing device 101 and/or the network nodes 105, 107, and 109 may be a server hosting one or more databases.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, database creation and manipulation software 127 and other applications 129. Control logic 125 may be incorporated in and may be a part of database creation and manipulation software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for creating and/or modifying a target database with content from one or more source databases.

Figure 2:
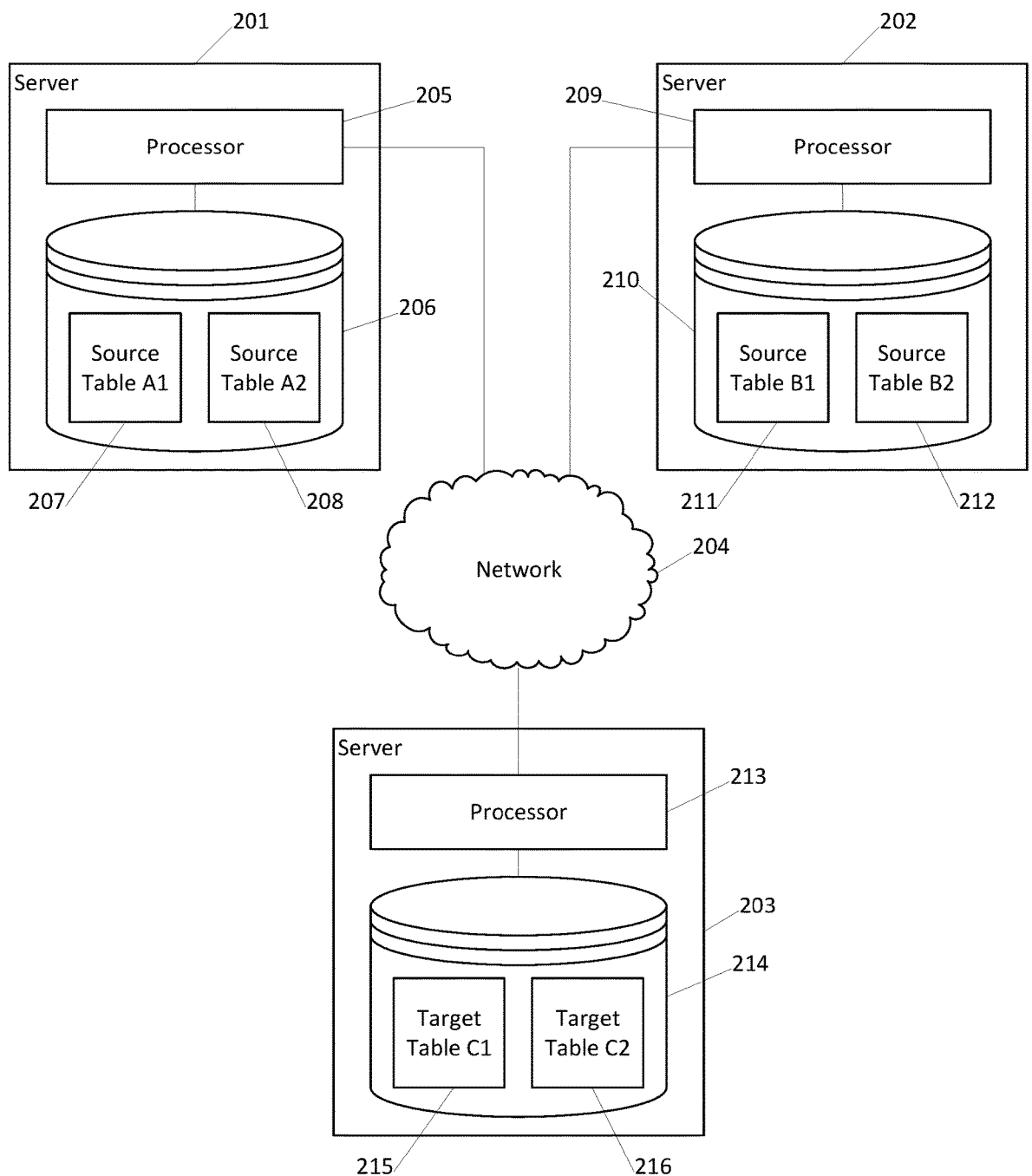
FIG. 2 depicts an example of a network comprising servers and databases.

FIG. 2 depicts an example of a network of two or more servers each supporting one or more tables. A server 201, a server 202, and a server 203 may be connected to each other via network 204. Network 204 may be represented as a single network but may comprise combinations of other networks or subnetworks.

The server 201 may include one or more processors 205, a database 206 comprising one or more source tables. The database 206 may include a source table A1 207 and a source table A2 208. The server 202 may include one or more processors 209, a database 210 comprising one or more source tables. The database 210 may include a source table B1 211 and a source table B2 212. The server 203 may include one or more processors 213 and a database 214 comprising one or more target tables, e.g., a target table C1 215 and a target table C2 216.

Target table C1 215 may be created based on content from one source table on one server (e.g., from source table A1 207 at server 201), based on content from two tables at a common server (e.g., from source table A1 207 and source table A2 208 at server 201), and/or based on tables from two or more servers (e.g., source table A1 207 from server 201 and source table B1 211 from server 202), or any combination thereof. Additionally, as some tables may be partitioned in time, geographical region, and other criteria, a target table may be created from a first set of rows from a first table and a second set of rows from a second table. Further, target tables may obtain content from other target tables (e.g., content from target table C1 215 may be used to create or append content to target table C2 216).

Figure 3:
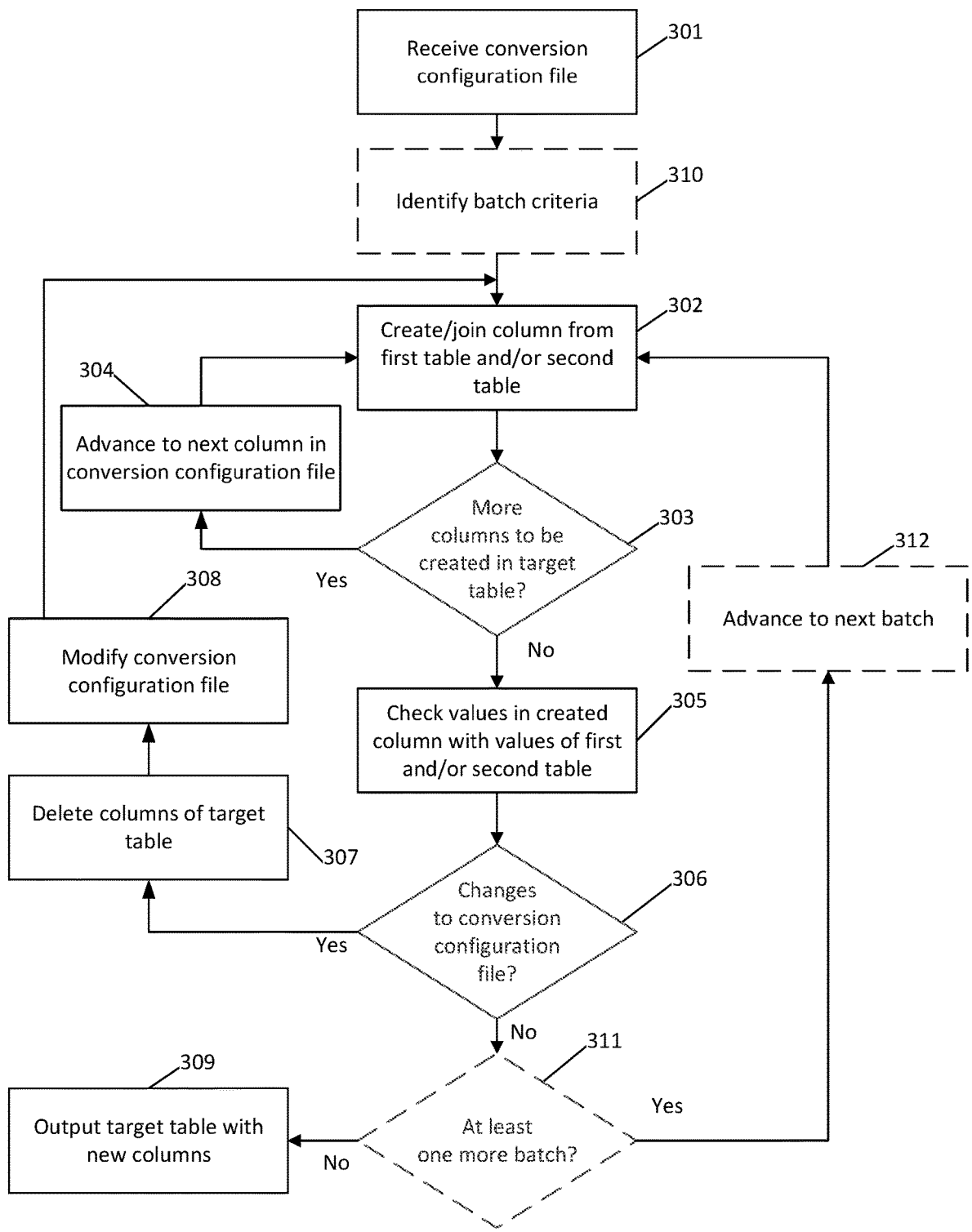
FIG. 3 depicts a flow chart for a method of combining data from source tables to create or modify a target table.

FIG. 3 is an example of a flowchart describing a process for creating one or more columns in a target table in accordance with one or more aspects described herein. The method of FIG. 3 may be implemented by a suitable computing system, for instance, as described above with respect to FIGS. 1 and/or 2. For example, the method of FIG. 3 may be implemented by any suitable computing environment by a computing device and/or combination of computing devices, such as computing devices 101, 105, 107, and 109 of FIG. 1. The method of FIG. 3 may be implemented in suitable program instructions, such as in database creation and manipulation software 127, and may operate on a suitable data such as data from server 201 or data from server 202.

At step 301, a conversion configuration file, relating to creating one or more columns of a target table, is received. The conversion configuration file may be obtained based on a previous request for the conversion configuration file or may receive the conversion configuration file as not being based on previous request.

At step 302, a column in the target table may be created based on information from a first source table and/or a second source table. For example, the column in the target table may include content from a first column from the first source table. Additionally or alternatively, the column in the target table may be the result of a join operation of the column in the first target table with a related column in a source table, e.g., in structured query language (SQL), the join operation may include merging data from a source table, appending data from a source table, or any other combining operation (e.g., including but not limited to inner join, outer join, full join, self join, and the like).

At step 303, the process determines whether the conversion configuration file includes more columns to be created in the target table. If there are more columns to be created in the target table, the process advances to the next column in the conversion configuration file in step 304. If there are no more columns to be created in the target table, the process checks, in step 305, the values in the created column or columns with the values used to create those columns from the content from the first and/or second source tables. Based on the checking of values in the target table with those values of the source tables used to create the target table, the conversion configuration file may need to be modified to account for discrepancies between the values. For example, a checking operation of step 305 may include converting a value of a given cell in the target table to a text representation of that information and convert a value of a cell from the source table, used to create the given cell, into a text representation of that information. The conversion to the text representation may perform one or more operations including, but not limited to, converting various representations of spaces to a single representation of a space (e.g., converting a non-breaking space (Unicode U+00A0/HTML & #160 or   to a regular space (ASCII 32/Unicode U+(0032)), converting non-printing characters (e.g., line break/tab character/soft hyphen/page break/pilcrow) to a regular space or other character or no character, and/or converting multiple representations of characters to a singular representation of that character (e.g., converting two or more periods/periods of ellipses to a single period or converting two or more spaces to a single space, etc.). In some situations, these conversions may be substitutions (e.g., a one-to-one substitution), concatenations (e.g., of separate columns of a date hierarchy), or other operations. Further, the conversion process may replace a single character with two or more characters (e.g., a plus-minus sign "±" with a plus sign "+" followed by a minus sign "−" or plus and minus signs separated by another character—e.g., a slash "/"— as "+/−"). The conversion process may further replace single byte encoding with double byte encoding or, where possible or practicable, replace double byte encoding with single byte encoding.

The conversion process may include rules for converting between different data types including numeric data types (e.g., int, tinyint, bigint, float, real, etc.), date and time data types (e.g., date, time, datetime, etc.), character and string data types (e.g., char, varchar, text, etc.), Unicode character string data types (e.g., nchar, nvarchar, ntext, etc.), binary data types (e.g., binary, varbinary, etc.), and miscellaneous data types (e.g., clob, blob, xml, cursor, table, etc.).

The conversion configuration file received in step 301 may further identify a table type associated with one or more source tables. The table types (e.g., tables that track Slowly Changing Dimensions in the field of data management and/or data warehousing) may include one or more of Type 0 (fact data—never changing attributes relating to durable values—e.g., dates of birth, initial credit scores, etc.), Type 1 (another type of fact data but includes changing fact data—overwrite old data with new data—e.g., current address of a customer or merchant), Type 2 (history data—add new row as tracking historical data—e.g., transaction history of a customer or merchant), Type 3 (add new attribute by preserving limited history—e.g., adding a column to track an immediately preceding location of a customer or a merchant), Type 4 (a history table of data and a history of how that data has changed), and Type 6 (a combined approach of using multiple tables together). Other variations and/or combinations are known and yet further table types are possible. This description is not intended to be limiting to only those above identified table types.

Further, multiple conversion configuration files may be used. For example, a first conversion configuration file may combine columns from a fact source table (a first source table) and a history source table (a second source table). Next, a second conversion configuration file may combine columns from a limited history source table (a third source table) with the target table. Multiple conversion configuration files may be used to combine different source tables of the same or different table types.

Additionally or alternatively, the conversion process may include adjusting for regional differences including, but not limited to, the representation of dates to a common convention. For example, the US standard MM/DD/YYYY, the European standard DD/MM/YYYY, and the Japanese standard of YYYY/MM/DD may all be converted to a common convention (e.g., YYYY/MM/DD). This conversion may also be applied to the representation of numbers (e.g., ensuring the thousands place separator is the same across jurisdictions and the decimal separator is the same across jurisdictions).

Once values are converted to a common format, the values may be compared against each other to ensure that they are the same. For instance, a conversion configuration file may take transaction date information from a first source table with a first date convention and transaction date information from a second source table with a second date convention to create a target table using one of the date conventions. While schemas relating to the first table and the second table may both identify columns as having date information, the schemas may not identify the format in which the data in the column is stored. That localization information may be stored separately from the schema information for the tables. Using the source table values and source table schema information without the source table's localization information may result in different results based on conversion of the source and target content to a common format. Further, localization information for a given source table may be unavailable or non-existent as users of the source table may expect data to be stored in a first format while users of the target table may expect data to be stored in a second format. This format difference may be address by comparing the normalized values of the source table with the normalized values from the target table as compared in step 305.

In step 306, based on whether the values in the columns of the target table match the values from the source table or tables, the conversion configuration file may need to be modified to change how the column or columns in the target table are created. For example, a first version of a configuration file may interpret a date column in a source table to use a US format for the representation of dates. In step 302, a value of "1/2/2000" from a source table may be used to create a value in a target table represented by "1/2/2000". During a checking operation in step 305, both the source and target values may be converted to a normalized value of, for instance, a month value, a day value, and a year value (both represented by month=1, day=2, year=2000). A next value in a source table may include "20/2/2000". The corresponding target value may be "20/2/2000". Converting both the source and target values to the normalized format may result in month=20, day=2, and year=2000. As this interpretation of 20 representing a month is erroneous, the conversion configuration file may be identified in step 306 as requiring an update to interpret the values of the source table as {day, month,year} and not {month,day,year}.

As another example, a source table may include data in a column identified as text (e.g., value "12345" and value "01234"). A target column may have been created in which the values are represented as integers (e.g., value "12345" and value "1234"). Converting both sets of values in step 305 to a text representation results in the "12345" values being the same but the "01234" and "1234" values being different. Accordingly, the conversion configuration file may be identified in step 306 as needing correction and identifying values that do not compare between the source and target fields.

If, in step 306, the conversion configuration file is identified as needing to be modified, the columns of the target table that do not match the corresponding values of the source table or tables may be deleted in step 307. In step 308, the conversion configuration file may be modified and the process returns to step 302 to recreate the column or columns of the target table using the modified conversion configuration file. If in step 306, the conversion configuration file is determined not to be modified, the process continues to step 309 where the target table is output with the new column or columns.

The process of FIG. 3 may be performed for entire columns in source tables or may be performed in batches comprising one or more rows of data in source tables. For example, the process of FIG. 3 may be performed in batches by, in step 310, identifying batch criteria to permit segmented creation of the columns in the target table. The batch criteria may include, for instance, a given number of rows in the source table to identify as a batch, a given date range for a date column in the source table, a location where data was entered for the source table, a partition of the source table, one or specific operators of the source table, and the like. Based on that criteria, the create/join process of step 302 may proceed based on the first batch of data. In step 311, the process determines whether at least an additional batch of data is to be processed. If the at least one more batch exists, then the process advances to the next batch in step 312 and processes the next batch of data for the target column in step 302.

Steps 310, 311, and 312 are shown in dashed lines as relating to the batch creation process of the target table. The remaining steps are shown in solid lines as generally relating to the continuous column creation process. It is appreciated that the order in which steps 301-310 are performed may be modified and/or replaced by other related steps without departing from the scope of the disclosure. For example, step 307 deleting columns of the target table may be performed before or after the conversion configuration file has been modified in step 308. Additionally or alternatively, step 307 may be performed for all unwanted columns in the target table after all desired columns of the target table have been created (e.g., after no more changes to the conversion configuration file are to be made as determined in step 306). This alternative approach of waiting until the final target table is completed may benefit the modification process of step 308 by permitting developers a historical view of alternative approaches to column creation in previous builds of the conversion configuration file.

Further, step 311 (determining whether at least one more batch has yet to be processed) is shown in FIG. 3 as occurring after the conversion configuration file is modified to account for disagreement between values in the target table and values in the source table or tables (the values having been checked in step 305 and whether to modify the conversion configuration file in step 306). Alternatively, two or more batches may be processed before checking in step 305 whether the values in the source table or tables comport with those in the target table. For example, where an initial batch designation is small (e.g., each batch being set to one hour's worth of data), multiple batches equating to longer time (e.g., half a day or a full 24-hour day) may be grouped together before checking the values in the source columns against the values in the target column or columns. Further, all batches may be processed before checking in step 305.

Figure 4:
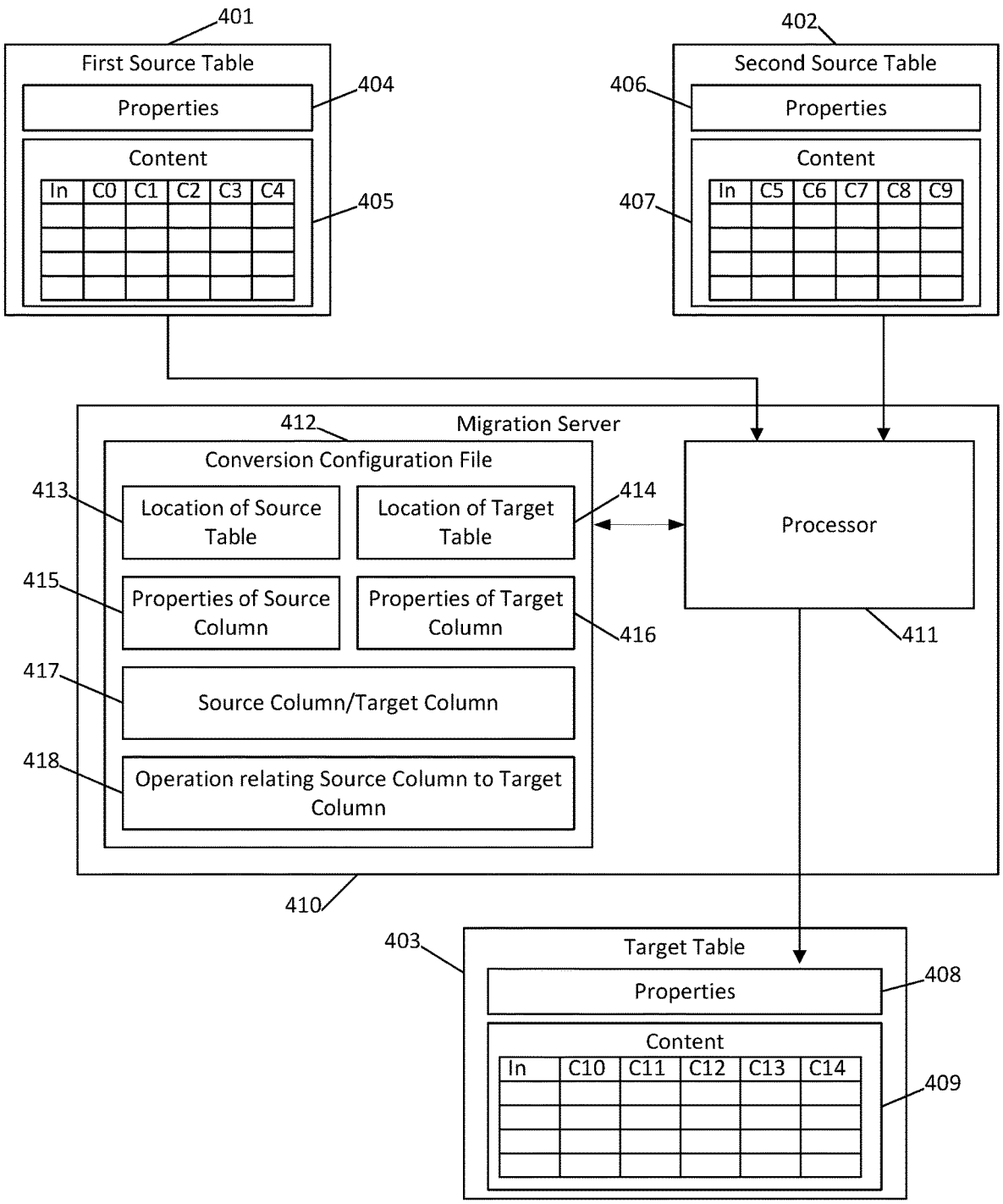
FIG. 4 depicts rows and columns in source tables being used to create rows and columns in a target table.

FIG. 4 shows rows and columns in source tables being used to create rows and columns in a target table. A first source table 401, a second source table 402, and a target table 403 each contain table property information and content. For example, the first source table 401 includes property information 404 and table content 405. The table content 405 is represented in rows and columns. The first column of the first source table 401 is an index column "In" and the remaining columns are identified as columns C0-C4. Column headers "C0-C4" may be included as a first row in content 405 or may be identified separately (for instance, as part of properties 404). The index column "In" may be an actual part of the values in table 405 or may be an effective index that exists in a system operating on the content 405 but does not exist as part of the content 405. The second source table 402 includes property information 406 and table content 407. The table content 407 is represented in rows and columns. The first column of the second source table 402 is an index column "In" and the remaining columns are identified as columns C5-C9. The target table 403 includes property information 408 and table content 408. The table content 408 is represented in rows and columns. The first column of the target table 403 may be an index column "In" and the remaining columns are identified as columns C10-C14. Similar to the column and row identifiers of the first source table, the second source table and/or the target table may or may not have the column header as part of the content 407, 409 and may or may not have an actual index column as part of the content 407, 409 (but effectively identify the row for a server by the server, for instance, counting the number of line terminuses in a column to arrive at an effective row identification). The properties 404, 406, and 408 may comprise schema information for the tables. The schema information may be explicit or implicit or a combination of both (e.g., including the actual schema information or identifying a location from which at least some schema information may be obtained).

FIG. 4 further comprises a migration server 410 that receives content from one or more of the source tables and generates columns of values in the target table based on values from at least one of the source tables. The migration server 410 includes at least one processor 411 and a conversion configuration file 412. The conversion configuration file may comprise one or more of a source table location 413, a target table location 414, source column properties 415, target column properties 416, the relationship 417 between the source column or columns to the target column, and/or an operation 418 or operations to be performed when using values from the source column to create the target column. While represented in FIG. 4 as a single file, the conversion configuration file 412 may be a single file with information useable by the migration server 410, may be multiple files that together provide the information for the migration server 410, may include one or more links to locations having information 413-418 useable by the migration server 410, or combinations of actual information and links to the information.

Using the information from the conversion configuration file 412, the processor 411 identifies the location of the source table 413 and the location of the target table 414. The source table may be retrieved or only a portion (e.g., one or more columns and one or more rows) of values stored in the source table may be retrieved. The properties information 404 of the first table may also be retrieved in whole or only the portion or portions relating to the rows and/or columns related to the source columns identified in the source column/target column information 417 of the conversion configuration file 412. The properties information 404 of the first source table may include general information describing the first source table 401 and/or specific information describing the content 405. For example, general information relating to the source table may include information documenting the first source table's creation date, date of last modification, interval between modifications, alternative locations of the first source table 401, including but not limited to partition information of the first source table 401. The information relating to the properties of the column of the source table is shown generally as 415.

The properties information 408 may be retrieved from the target table 403 or may be created in the migration server 410 and then output as properties 408. The properties of the target column are shown generally as 416 in the migration server 410. Information 417 relates a source column to a target column. Information 418 describes an operation relating a source column to a target column. For instance, the operation 418 may be a join operation, a split column operation, a pivot or unpivot column operation, and the like. Further, although the operation 418 includes source and target columns, operation 418 may take values from multiple source columns and generate values for multiple target columns, may take values from one source column and generate values for multiple target columns, and/or may take values from multiple source columns and generate values for one target column.

Figure 5:
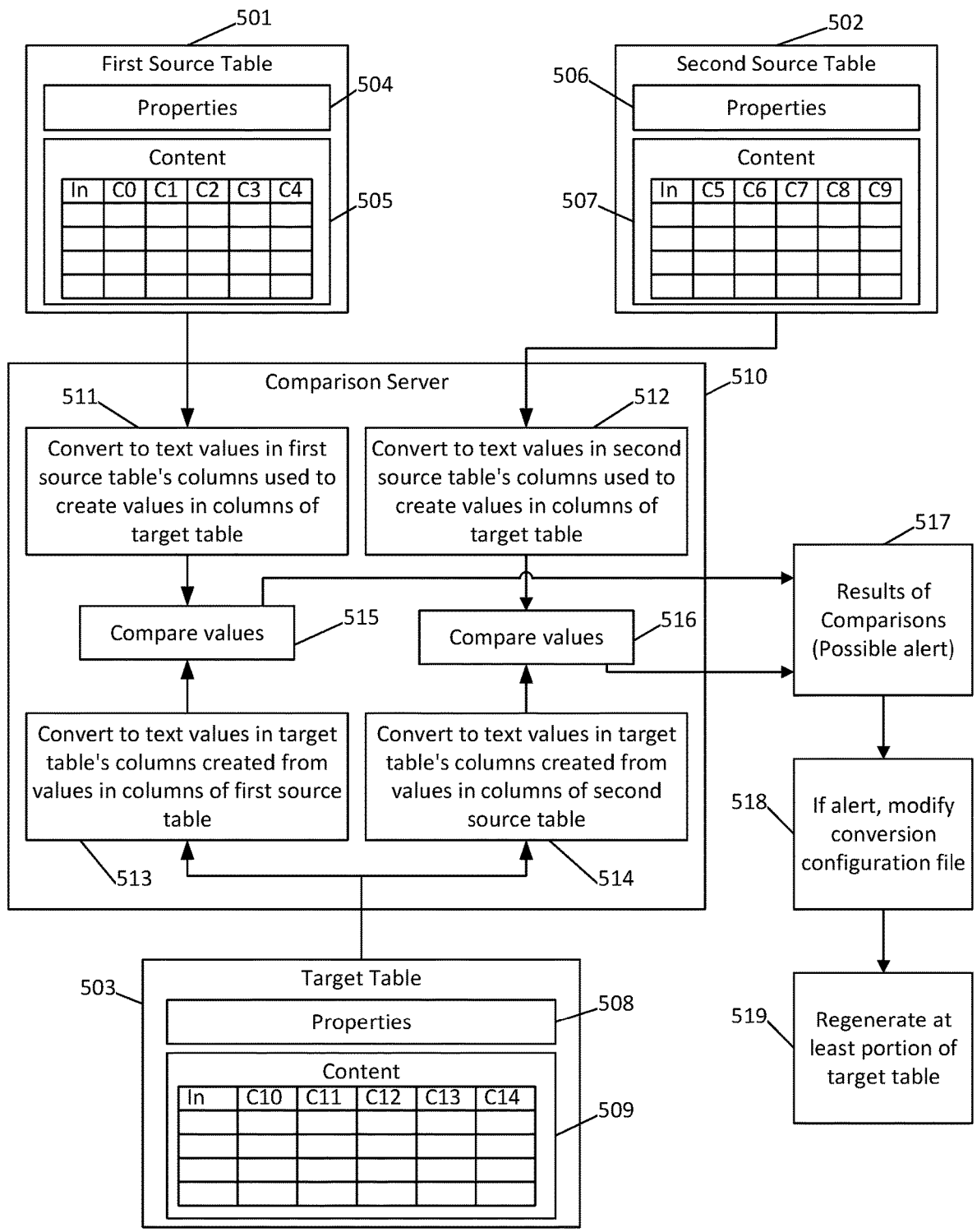
FIG. 5 depicts rows and columns from a target table being compared with rows and columns of source tables.

FIG. 5 depicts rows and columns from a target table being compared with rows and columns of source tables. FIG. 5 shows a first source table 501, a second source table 502, target table 503, and a comparison server 510. The first source table 501 includes properties information 504 and content 505. Properties information 504 may include schema information relating to the content 505. The content 505 includes rows and columns of information. The second source table 502 includes properties information 506 and content 507. Properties information 506 may include schema information relating to the content 507. The content 507 includes rows and columns of information. The target table 503 includes properties information 508 and content 509. Properties information 508 may include schema information relating to the content 509. The content 509 includes rows and columns of information.

The comparison server 510 may compare the content from the source tables to the created content in the target table. In step 511, content 505 from the first source table 501, used to create content 509 in the target table 503, is converted to normalized values (e.g., text values). In step 512, content 507 from the second source table 502, used to create content 509 in the target table 503, is converted to normalized values (e.g., text values). In step 513, content 509 from the target table 503, created from content 505 from the first source table 501, is converted to normalized values (e.g., text values). In step 514, content 509 from the target table 503, created from content 507 from the second source table 502, is converted to normalized values (e.g., text values). In step 515, the normalized values from step 511 are compared with the normalized values from step 513 and the results of the comparison are output as results 517. Similarly, in step 516, the normalized values from step 512 are compared with the normalized values from step 514 and the results of the comparison are output as results 517. The results 517 may be used to determine whether, in step 306 of FIG. 3, the content 509 of target table 503 accurately reflects the content 505 from source table 501 and the content 507 from source table 502. For example, if the results 517 of the comparisons indicate that the values from the source data do not match the values in the target data, then an alert is generated in step 517. Based on the alert, an operator may modify the conversion configuration file in step 518. In step 519, the target table or at least columns relating to the modifications in the conversion configuration file are generated. Possibly, the resulting target columns may be again compared with the content from the first and/or second source tables.

For example, the alert may include an identification of a difference between the content of the non-matching cells from the first batch and the portion of data from the target database. Additionally or alternatively, the alert may include an identification of a difference between the content of the non-matching cells from the first batch and the portion of data from the target database and an identification of a modification to conform the content of the cells to each other. For example, based on historical information relating to previous corrections may be used to suggest how to address current alerts based on identified issues when comparing the source and target values. For instance, a lookup table may be provided, indexed by error code and type of error, with a solution provided (e.g., having a month value of "20" and a day value of "02" may include a suggestion to reverse the day and month identifiers for the source values.

Figure 6:
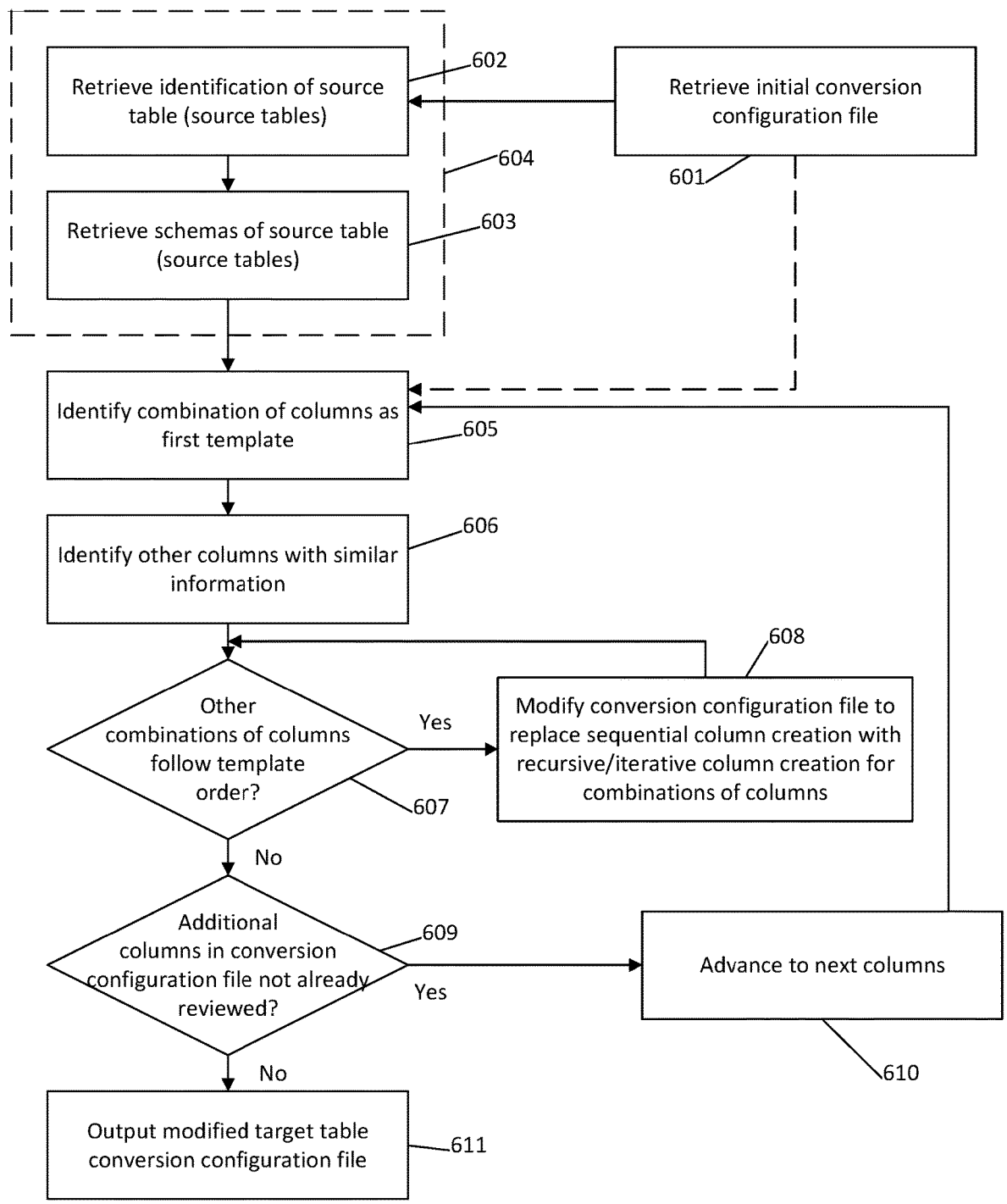
FIG. 6 depicts a flow chart for a method of modifying a conversion configuration file to incorporate iterative instructions.

FIG. 6 depicts a flow chart for a method of modifying a conversion configuration to incorporate iterative instructions. One of the difficulties in combining source tables into one or more target tables often is the number of columns across multiple source tables. To reduce the burden of creating conversion configuration file, the process of FIG. 6 attempts to combine similar sequential instructions in a conversion configuration file into recursive instructions.

In step 601 of FIG. 6, an initial version of a conversion configuration file is received by, for example, a migration server of FIG. 4 or another server (or combination of servers). The initial version of the conversion configuration file may comprise instructions to create columns in a target table based on content in a source table. Those instructions may also include an identification of the source table or identifications of multiple source tables. The instructions may or may not include batch information to identify batches to be used to create the content in the target table. For instance, the batch information may comprise date information, partition information, source table or tables information, time information, event information, user identification information (e.g., account numbers, user names, user addresses, and the like), merchant identification information (e.g., merchant numbers, merchant names, merchant addresses, and the like), and other similar information.

In step 602, the identification of the source table may be retrieved. The source table identification may be extracted from the initial conversion configuration file 601 or may the identification may be acquired separately. For instance, the source identification may be separately stored as a table of multiple sources to be tapped to obtain information for creation or augmenting a target table.

In step 603, a schema of the source table or schemas of source tables may be obtained. The schema or schemas may include information relating to the properties of the source table. Some of the properties may include data types, length of columns, order of columns, relationships between columns and the like. The properties information may further identify the type of table. The information retrieved in steps 602 and 603 may be contained in the initial conversion configuration file.

The information retrieved in steps 602 and 603 may be contained in the initial conversion configuration file. Additionally or alternatively, the schema information and/or the identification of the source tables may be separate from the initial conversion configuration file. Further, the initial conversion configuration file may not be required to be obtained prior to obtaining the source table information and/or the schema information. For example, as shown by the dashed box 604 around steps 602 and 603, the identification information and the schema information may be retrieved independently of when the initial conversion configuration file is received. As an example, the source tables may be preprocessed prior to when the initial conversion configuration file is received and the initial conversion configuration file received at step 605.

In step 605, a combination of columns in the initial conversion configuration file is identified. That combination may be used as a first template to generate subsequent combinations of columns in the same or other source tables that follow the same template. For example, an initial combination of columns may include one or more of, for an immutable fact table (e.g., a table Type 0 storing fact data), a customer identification number and a date. The customer identification number may include a numeric or alphanumeric code associated with that individual, a social security number, or other identification. The date may include a birth date, a first date of credit history, a first date when credit was provided to the customer, etc. Additionally, the initial conversion configuration file may identify a specific set of columns as a template to be used for identifying and/or processing other columns.

In step 606, other columns are searched in the source table or tables matching the combination of schema or properties for the template identified in step 605. For example, the customer number column of the combination of columns may include alternative labels that may be used to search for similar columns. The similarity in columns may be identified by a name or label in the schema (e.g., "customer", "customer name", "customername", "identification", "ID", "account", "accountID", and the like). Columns may be considered date columns, for instance, when labeled as a date column by a data type identified in a schema, by occurrence of delimiters in a pattern signifying a date (e.g., slashes as the third and sixth characters in a text string), or identification through a value in a row associated with the customer identifier (e.g., in a column "startdate", a value of "Col4" relating to a column relative to the "startdate" column or customer identifier column).

In step 607, the schema of other columns are searched to determine whether they have the same combination of columns as the template columns. When searching the same table as that in which the combination of columns was identified as a template, step 607 may search each column's schema and may also search for an order of columns matching the order of the combination of columns. When searching a different table, step 607 may compare the Table Type of the additional source table to that of the initial source table in addition to searching each column's schema and/or the order of columns matching the order of the combination of columns.

If additional combinations of columns are identified in step 607 that match the template, then the initial conversion configuration file is modified in step 608 to replace the instructions to generate the combination of columns with a recursive (e.g., iterative) instruction to generate the combination of columns and the additional columns using the initial columns and the additional columns as values in the iterative generation process.

After step 608, the process returns to step 607 to find additional columns following the same template as identified in step 606.

When no additional columns match the template as determined in step 607, the process determines whether other columns in the conversion configuration file exist and that those columns have not already been reviewed for iterative processing. If additional columns do exist in the conversion configuration file, then the process advances in step 610 to the next column or group of columns, identifies the next template in step 605, and then reviews the remaining columns in the source table or source tables. When no more templates are identified or no more columns exist that have not been associated with iterative generation based on a template, the system outputs the conversion configuration file in step 611. Step 611 may include sending the file to a remote location or sending an identification of the conversion configuration file to a remote location.

Figure 7:
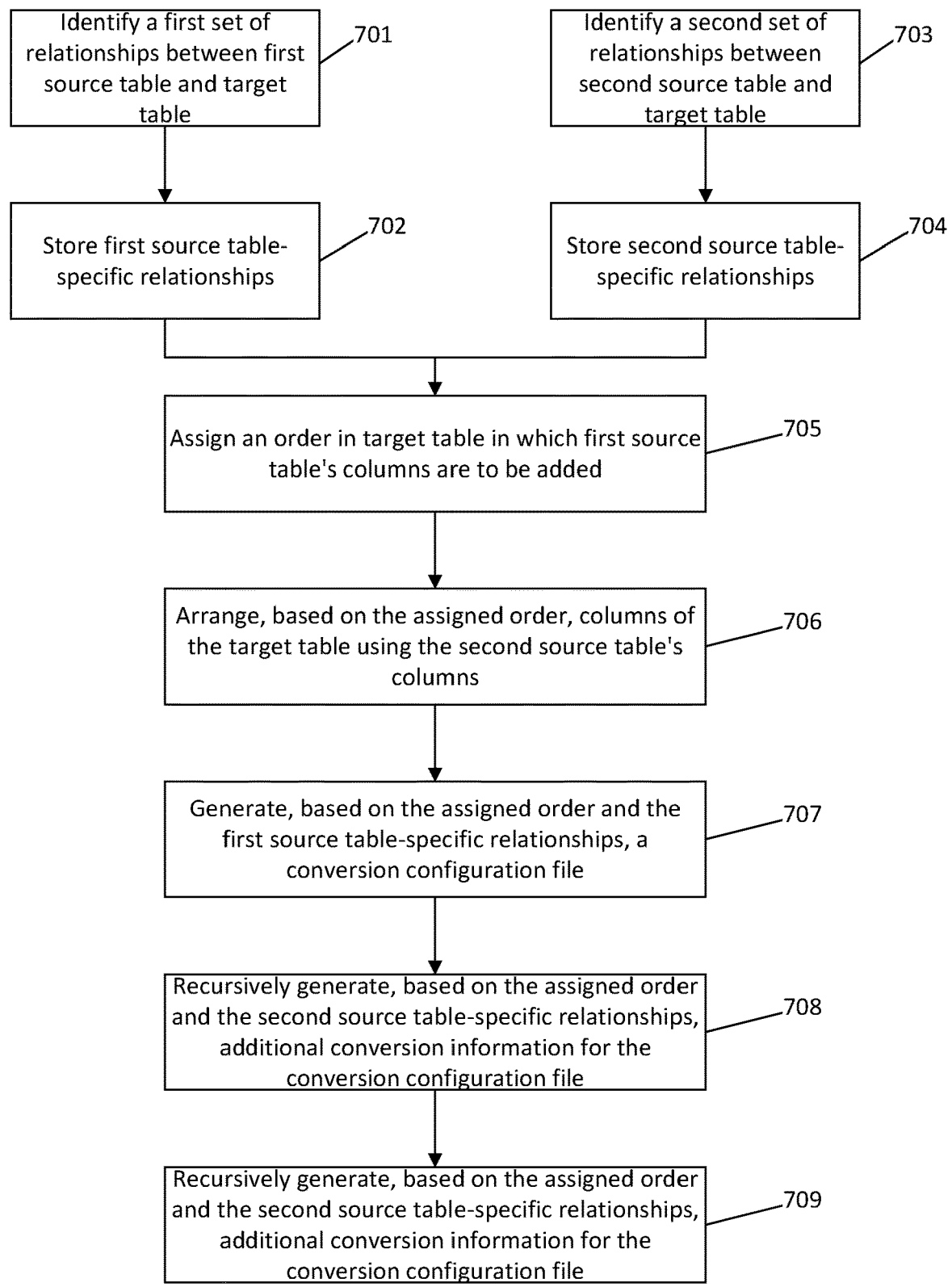
FIG. 7 depicts a flow chart for generating a conversion configuration file.

FIG. 7 depicts a process for creating a conversion configuration file. In step 701, a first set of relationships between a first source table and a target table are identified. In step 702, the relationships are stored as first source table-specific relationships. In step 703, a second set of relationships between a second source table and a target table are identified. In step 704, the relationships are stored as second source table-specific relationships. In step 705, an order is assigned in a target table in which the first source table's columns are to be added to the target table. In step 706, columns of the target table, to be generated from values of the second source table, are arranged based on the assigned order from step 705.

In step 707, based on the assigned order and the first source table-specific relationships, generate a conversion configuration file. In step 708, recursively generate, based on the assigned order and the second source table-specific relationships, additional conversion information. In step 709, add the additional conversion information to the conversion configuration file.

In this example, two source tables are described. However, a conversion configuration file may be created using only a first source table by removing steps 703, 704, 706, and 708.

Some aspects described herein may provide benefits for database conversion, such as: removing partitions from legacy databases while transitioning to cloud-based storage; correcting errors in conversion configuration files before the executing the files on entire databases; and improving the process for creating conversion configuration files through scanning files for templates then replacing code based on an iterative model instead of a sequential model for the code.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
receiving a configuration file, wherein the configuration file comprises sequential instructions for converting first source columns of a first source table and second source columns of a second source table into first target columns and second target columns of a target table;
receiving the first source table and the second source table, wherein the first source table comprises first descriptive information of the first source columns, and wherein the second source table comprises second descriptive information of the second source columns;
identifying, based on the first source table and based on the first descriptive information, a set of first source columns, of the first source table, as a first template;
determining, based on the first template and based on the first descriptive information, whether second source columns of the second source table have second descriptive information at least partially matching the first descriptive information of the set of the first source columns;
modifying, based on a determination that the second descriptive information of the second source columns at least partially matches the first descriptive information of the set of the first source columns, the configuration file by replacing the sequential instructions, for generating the second target columns, with recursive instructions; and
executing, based on the first source columns and the second source columns, the modified configuration file to populate the first target columns and the second target columns, respectively.

2. The computer-implemented method of claim 1, wherein receiving the first source table and the second source table comprises receiving, for the first source table, first schema information as the first descriptive information and, for the second source table, second schema information as the second descriptive information, and
wherein the determining whether the second source columns have second descriptive information at least partially matching the first descriptive information comprises determining whether the first schema information, of the set of the first source columns, at least partially matches the second schema information, of the second source columns.

3. The computer-implemented method of claim 1, further comprising:
determining, based on the determining the second source columns of the second source table have second descriptive information at least partially matching the first descriptive information, whether third source columns of the second source table have third descriptive information at least partially matching the first descriptive information, wherein the modifying the configuration file is further based on a second determination that the third descriptive information of the third source columns at least partially matches the first descriptive information of the set of the first source columns.

4. The computer-implemented method of claim 1, further comprising:

identifying, based on the first source table and based on the first descriptive information, third source columns, of the first source table, as a second template; and determining, based on the second template and based on the first descriptive information, whether fourth source columns of the second source table have second descriptive information at least partially matching the first descriptive information of the third source columns, wherein the modifying is further based on a determination that the second descriptive information of the fourth source columns at least partially matches the first descriptive information of the third source columns, and wherein the modifying further replaces the sequential instructions, for generating fifth target columns, with recursive instructions.

5. The computer-implemented method of claim 1, wherein the determining whether second source columns of the second source table have second descriptive information at least partially matching the first descriptive information of the set of the first source columns comprises determining whether labels of the second source columns start with matching text as labels of the set of the first source columns.

6. The computer-implemented method of claim 1, wherein the determining whether second source columns of the second source table have second descriptive information at least partially matching the first descriptive information of the set of the first source columns comprises determining whether data types of the second source columns match data types of the set of the first source columns.

7. The computer-implemented method of claim 1, wherein the determining whether second source columns of the second source table have second descriptive information at least partially matching the first descriptive information of the set of the first source columns comprises matching an order of the second source columns with an order of the set of first source columns in the first template.

8. An apparatus comprising:

one or more processors; and memory storing instructions that, when executed by the one or more processors, cause the apparatus to:

receive a configuration file, wherein the configuration file comprises sequential instructions for converting first source columns of a first source table and second source columns of a second source table into first target columns and second target columns of a target table;

receive the first source table and the second source table, wherein the first source table comprises first schemas of the first source columns, and wherein the second source table comprises second schemas of the second source columns;

identify, based on the first source table and based on the first schemas, a set of first source columns, of the first source table, as a first template;

determine, based on the first template and based on the first schemas, whether second source columns of the second source table have second schemas at least partially matching the first schemas of the set of the first source columns;

modify, based on a determination that the second schemas of the second source columns at least partially match the first schemas of the set of the first source columns, the configuration file by replacing the sequential instructions, for generating the second target columns, with recursive instructions; and execute, based on the first source columns and the second source columns, the modified configuration file to populate the first target columns and the second target columns, respectively.

9. The apparatus of claim 8, wherein the instructions further cause the one or more processors to:

determine, based on the determination that the second schemas of the second source columns at least partially match the first schemas, whether third source columns of the second source table have third schemas that at least partially match the first schemas, wherein the modification of the configuration file is further based on a second determination that the third schemas of the third source columns at least partially match the first schemas of the set of the first source columns.

10. The apparatus of claim 8, wherein the instructions further cause the one or more processors to:

identify, based on the first source table and based on the first schemas, third source columns, of the first source table, as a second template; and determine, based on the second template and based on the first schemas, whether fourth source columns of the second source table have second schemas at least partially match the first schemas of the third source columns, wherein the instructions to modify are further based on a determination that the second schemas of the fourth source columns at least partially match the first schemas of the third source columns, and wherein the instructions to modify further cause the one or more processors to replace the sequential instructions, for generating fifth target columns, with recursive instructions.

11. The apparatus of claim 8, wherein the instructions to determine whether second source columns of the second source table have second schemas that at least partially match the first schemas of the set of the first source columns further cause the one or more processors to determine whether labels of the second source columns start with matching text as labels of the set of the first source columns.

12. The apparatus of claim 8, wherein the instructions to determine whether second source columns of the second source table have second schemas that at least partially match the first schemas of the set of the first source columns further cause the one or more processors to determine whether data types of the second source columns match data types of the set of the first source columns.

13. The apparatus of claim 8, wherein the instructions to determine whether second source columns of the second source table have second schemas that at least partially match the first schemas of the set of the first source columns further cause the one or more processors to match an order of the second source columns with an order of the set of the first source columns in the first template.

14. One or more non-transitory media storing instructions that, when executed by one or more processors, cause the one or more processors to perform steps comprising:
receiving a configuration file, wherein the configuration file comprises sequential instructions for converting first source columns of a first source table and second source columns of a second source table into first target columns and second target columns of a target table;
receiving the first source table and the second source table, wherein the first source table comprises first descriptive information of the first source columns, and wherein the second source table comprises second descriptive information of the second source columns;
identifying, based on the first source table and based on the first descriptive information, a set of first source columns, of the first source table, as a first template;
determining, based on the first template and based on the first descriptive information, whether second source columns of the second source table have second descriptive information at least partially matching the first descriptive information of the set of the first source columns, wherein the determining comprises comparing table types of the first source table and the second source table;
modifying, based on a determination that the second descriptive information of the second source columns at least partially matches the first descriptive information of the set of the first source columns, the configuration file by replacing the sequential instructions, for generating the second target columns, with recursive instructions; and
executing, based on the first source columns and the second source columns, the modified configuration file to populate the first target columns and the second target columns, respectively.

15. The one or more non-transitory media of claim 14, wherein the instructions for receiving the first source table and the second source table, when executed by the one or more processors, cause the one or more processors to further perform steps comprising receiving, for the first source table, first schema information as the first descriptive information and, for the second source table, second schema information as the second descriptive information, and
wherein the instructions for determining whether the second source columns have second descriptive information at least partially matches the first descriptive information, when executed by the one or more processors, cause the one or more processors to perform further steps comprising determining whether the first schema information, of the set of the first source columns, at least partially matches the second schema information, of the second source columns.

16. The one or more non-transitory media of claim 14, wherein the instructions, when executed by the one or more processors, cause the one or more processors to further perform steps comprising:
determining, based on the determining the second source columns of the second source table have second descriptive information at least partially matching the first descriptive information, whether third source columns of the second source table have third descriptive information at least partially matching the first descriptive information,
wherein the instructions for modifying the configuration file are further based on a second determination that the third descriptive information of the third source columns at least partially matches the first descriptive information of the set of the first source columns.

17. The one or more non-transitory media of claim 14, wherein the instructions, when executed by the one or more processors, cause the one or more processors to further perform steps comprising:
identifying, based on the first source table and based on the first descriptive information, third source columns, of the first source table, as a second template; and
determining, based on the second template and based on the first descriptive information, whether fourth source columns of the second source table have second descriptive information at least partially matching the first descriptive information of the third source columns,
wherein the instructions for modifying are based on a determination that the second descriptive information of the fourth source columns at least partially matches the first descriptive information of the third source columns, and
wherein the instructions for modifying, when executed by the one or more processors, further cause the one or more processors to perform further steps comprising replacing the sequential instructions, for generating fifth target columns, with recursive instructions.

18. The one or more non-transitory media of claim 14, wherein the instructions for determining whether second source columns of the second source table have second descriptive information at least partially matching the first descriptive information of the set of the first source columns cause, when executed by the one or more processors, the one or more processors to perform further steps comprising determining whether labels of the second source columns start with matching text as labels of the set of the first source columns.

19. The one or more non-transitory media of claim 14, wherein the instructions for determining whether second source columns of the second source table have second descriptive information at least partially matching the first descriptive information of the set of the first source columns cause, when executed by the one or more processors, the one or more processors to perform further steps comprising determining whether data types of the second source columns match data types of the set of the first source columns.

20. The one or more non-transitory media of claim 14, wherein the instructions for determining whether second source columns of the second source table have second descriptive information at least partially matching the first descriptive information of the set of the first source columns cause, when executed by the one or more processors, the one or more processors to perform further steps comprising matching an order of the second source columns with an order of the set of first source columns in the first template.

* * * * *